US010075244B2

(12) United States Patent
Coffey

(10) Patent No.: US 10,075,244 B2
(45) Date of Patent: *Sep. 11, 2018

(54) PHYSICAL LAYER MANAGEMENT CONFIGURED ACTIVE OPTICAL MODULE WITH NATIVE AND NON-NATIVE NETWORK ELEMENT SUPPORT

(71) Applicant: CommScope Technologies LLC, Hickory, NC (US)

(72) Inventor: Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,580

(22) Filed: Aug. 17, 2017

(65) Prior Publication Data

US 2017/0346569 A1 Nov. 30, 2017

Related U.S. Application Data

(63) Continuation of application No. 15/167,478, filed on May 27, 2016, now Pat. No. 9,742,496.

(60) Provisional application No. 62/167,421, filed on May 28, 2015.

(51) Int. Cl.
*H04B 10/00* (2013.01)
*H04B 10/40* (2013.01)
*H04L 29/08* (2006.01)
*H04B 10/27* (2013.01)
*H04B 10/25* (2013.01)

(52) U.S. Cl.
CPC ............. *H04B 10/40* (2013.01); *H04B 10/25* (2013.01); *H04B 10/27* (2013.01); *H04L 69/323* (2013.01)

(58) Field of Classification Search
CPC ........ H04B 10/40; H04B 10/25; H04B 10/27; H04L 69/323
USPC ........................................................ 398/115
See application file for complete search history.

(56) References Cited

U.S. PATENT DOCUMENTS 9,380,874 B2 * 7/2016 Coffey ................. A47B 91/005
9,453,971 B2 * 9/2016 Anderson .............. G02B 6/381
9,507,113 B2 * 11/2016 Lawson ............... H04B 10/801
(Continued)

OTHER PUBLICATIONS

United States Patent and Trademark Office, "Notice of Allowance", "From U.S. Appl. No. 15/167,478", dated Apr. 17, 2017, pp. 1-15, Published in: US.

(Continued)

*Primary Examiner* — M. R. Sedighian
(74) *Attorney, Agent, or Firm* — Fogg & Powers LLC

(57) ABSTRACT

Systems for a PLM configured active optical module (AOM) with native and non-native-network element support are provided. A system includes a non-native network element having a first port with a first inventory interface; a first pluggable AOM installed in the first port and coupled to the first inventory interface, where in response to a request to read a table entry the first pluggable AOM provides PLM information to the non-native network element; an extended network element having a second port with a second inventory interface; and a second pluggable AOM installed in the second port and coupled to the second inventory interface, where in response to a request to read a table entry, processing devices provide PLM information to the extended network element.

20 Claims, 7 Drawing Sheets

(56) References Cited

U.S. PATENT DOCUMENTS

| 9,742,496 B2* | 8/2017 | Coffey | H04B 10/40 |
| 2012/0033979 A1 | 2/2012 | Priyadarshi | |
| 2013/0343764 A1* | 12/2013 | Coffey | G02B 6/43 |
| | | | 398/135 |
| 2014/0019662 A1 | 1/2014 | Coffey | |
| 2014/0038462 A1 | 2/2014 | Coffey et al. | |
| 2015/0086211 A1* | 3/2015 | Coffey | H04B 10/40 |
| | | | 398/116 |

OTHER PUBLICATIONS

United States Patent and Trademark Office, "Notice of Allowance", "From U.S. Appl. No. 15/167,478", dated May 15, 2017, pp. 1-2, Published in: US.

International Search Report, "International Search Report and Written Opinion for PCT Application No. PCT/US2016/034777", "Foreign Counterpart to U.S. Appl. No. 15/167,478", dated Aug. 18, 2016, pp. 1-11, Published in: WO.

\* cited by examiner

QSFP + Memory Map

PHYSICAL LAYER MANAGEMENT CONFIGURED ACTIVE OPTICAL MODULE WITH NATIVE AND NON-NATIVE NETWORK ELEMENT SUPPORT

CROSS-REFERENCE TO RELATED APPLICATIONS

This is a Continuation Application, claiming priority to, and the benefit of, U.S. patent application Ser. No. 15/167,478, titled "PHYSICAL LAYER MANAGEMENT CONFIGURED ACTIVE OPTICAL MODULE WITH NATIVE AND NON-NATIVE NETWORK ELEMENT SUPPORT", filed on May 27, 2016, which claims priority to, and the benefit of, U.S. Provisional Patent Application Ser. No. 62/167,421, titled "PHYSICAL LAYER MANAGEMENT CONFIGURED ACTIVE OPTICAL MODULE WITH NATIVE AND NON-NATIVE NETWORK ELEMENT SUPPORT" filed on May 28, 2015, which are each incorporated herein by reference in their entirety.

BACKGROUND

Communication networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

A network or enterprise management system (generally referred to here as a "network management system" or "NMS") is typically aware of the logical communication links that exist in a network but typically does not have information about the specific physical layer media that are used to implement the logical communication links. Indeed, NMS systems typically do not have the ability to display or otherwise provide information about how logical communication links are implemented at the physical layer level.

Physical layer management (PLM) systems do exist. Conventional physical layer management (PLM) systems are typically designed to track connections that are made at a patch panel. That is, historically conventional PLM systems have been "patch panel centric" and have not included functionality to track connections that are made at active devices in a network (also referred to here as "network elements"). For example, such PLM systems typically do not automatically track connections that are made at network elements including a switch, router, hub, gateway, access point, server computer, end-user computer, appliance computers (such as network-attached storage (NAS) devices), and nodes of a storage area network (SAN) or other types of devices. Although there are management systems that are used to manage and collect information about such network elements, such management systems are typically separate from the PLM systems used to track connections made at a patch panel.

Some types of network elements utilize high speed optical fiber connectivity to interconnect ports from network elements such as servers, switches, and routers to other network elements. These network elements can be configured for use with a pluggable active optical module that converts a high speed serial electrical signal at a port of the network element to and from an optical signal. Such a pluggable active optical module can be integrated into a connector of a fiber optic cable or can be separate from any cable, which is commonly referred to as a pluggable active optical module (AOM). A pluggable AOM has an electrical connector on one side, for connection with a port of the network element, and one or more optical adapters on the other side for connection with a fiber optic cable. One example of a pluggable AOM is a small form-factor pluggable (SFP) module.

The mechanical and electrical interface between the network element and a pluggable active optical module is defined by a set of multi-source agreement (MSA) documents. These documents are based on functional requirements defined in IEEE standard 802.3 for Ethernet and T11 (X3T9.3) for Fiber Channel.

SUMMARY

Systems and methods for a physical layer management configured active optical module with native and non-native-network element support are provided. A system includes a non-native network element having a first port with a first inventory interface; a first pluggable active optical module installed in the first port and coupled to the first inventory interface, wherein in response to a request to read a standard table entry the first pluggable active optical module is configured to provide PLM information to the non-native network element in a format complying with a multi-source agreement (MSA) or a standard for the inventory interface. The system further includes an extended network element having a second port with a second inventory interface; and a second pluggable active optical module installed in the second port and coupled to the second inventory interface, wherein in response to a request to read a non-standard table entry, the one or more processing devices are configured to provide PLM information to the extended network element in a format configured for a physical layer management system.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1:
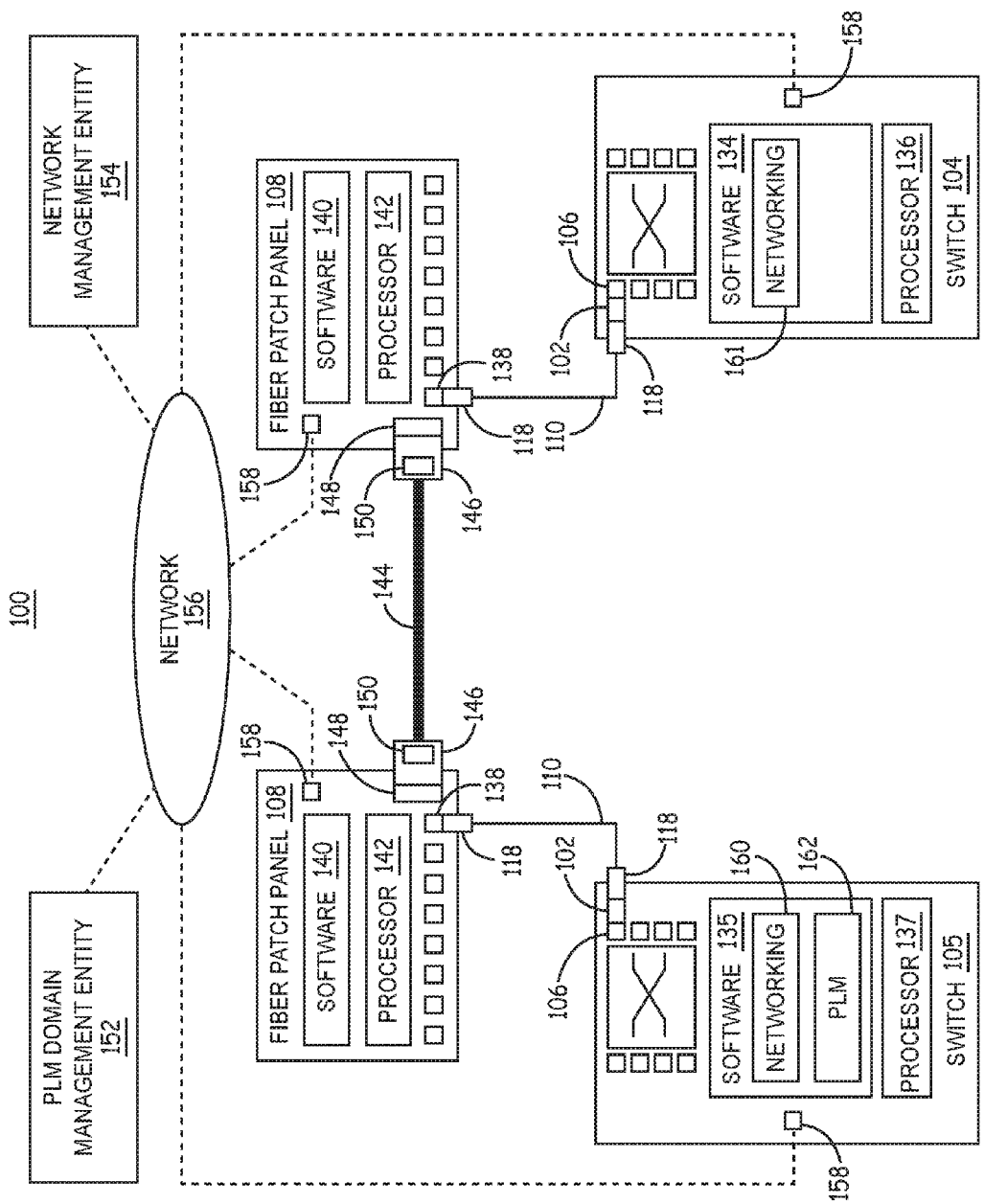
FIG. 1 is a block diagram of an exemplary embodiment of a system having PCM and pluggable AOMs connected between the PCM and respective network elements.

FIG. 1 is a block diagram of one example of a system 100 including physical communication media (PCM) 110 and pluggable active optical modules (AOMs) 102 connected between the physical communication media 110 and respective network elements 104. In this example, the physical communication media 110 is a duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables).

The system 100 is described here as including two network elements 104, 105 that are implemented as Gigabit ETHERNET switches 104, 105 (though the system 100 can include one, or more than two, switches 104, 105 and/or different types of network elements). Consequently, the two network elements 104, 105 shown in FIG. 1 are also referred to here as "switches" 104, 105. Examples of other types of network elements 104, 105 that can be used include, without limitation, routers, gateways, access points, server computers, end-user computers, appliance computers (such as network-attached storage (NAS) devices), and nodes of a storage area network (SAN). Also, in the example shown in FIG. 1, the system 100 includes two passive optical interconnects 108 that are implemented as two fiber patch panels 108 (though the system 100 can include a different number of fiber patch panels 108 (including a system without patch panels 108) and/or different types of passive optical interconnects 108). Consequently, the two passive optical interconnects 108 shown in FIG. 1 are also referred to here as "fiber patch panels" 108. Examples of other types of passive optical interconnects 108 that can be used include, without limitation, other types of optical patch panels, fiber distribution hubs (FDH), fiber splice panels, fiber trays, and fiber termination points. Examples of active optical modules 102 and physical communication media 110 include, without limitation, GIGABIT ETHERNET, FIBRE CHANNEL, INFINIBAND, Serial Attached SCSI (SAS), and SONET/SDH.

Many types of network elements 104, 105 and passive optical interconnects 108 include multiple ports, though the techniques described here are not limited to network elements 104, 105 or passive optical interconnects 108 that include multiple ports.

In the example shown in FIG. 1, a first active optical module 102 is connected to a (first) port 106 of a first switch 104. A second active optical module 102 is connected to a (second) port 106 of a second switch 105. A passive optical connector 118 at a first end 114 (shown in FIG. 2) of respective physical communication media 110 is connected to the first and second active optical modules 102. The active optical module 102 is configured to perform the electrical-to-optical (E/O) and optical-to-electrical (O/E) conversions for signals to be sent and received over the respective PCM 110 to and from a respective switch 104, 105.

In the example shown in FIG. 1, a passive optical connector 118 at a second end (shown in FIG. 2) of the PCM 110 is connected to a duplex port 138 of one of the two fiber patch panels 108. This fiber patch panel 108 is also referred to here as the "first" patch panel 108, and the port 138 to which the first physical communication media 110 is connected is also referred to here as the "first patch-panel port" 138. The passive optical connector 118 at the passive end of the second physical communication media 110 is connected to a duplex port 138 of the second of the two fiber patch panels 108. This fiber patch panel 108 is also referred to here as the "second" patch panel 108, and the port 138 to which the second active optical cable segment 110 is connected is also referred to here as the "second patch-panel port" 138.

In the example shown in FIG. 1, each of the patch-panel ports 138 of the fiber patch panels 108 is configured to include a storage-device interface (not separately shown). The storage-device interface in each port 138 is configured to mate and inter-operate with a storage-device interface used in the passive optical connector 118 of the second end 116 of the respective PCM 110. The native PLM storage-device interface is a hardware interface designed and optimized for managing the PCM 110 used in the network. That is, the native PLM storage-device interface is designed and optimized for physical layer management. Software 140 executing on a programmable processor (such as a controller) 142 associated with the fiber patch panel 108 is able to read and write data from and to a storage device 132 associated with any passive optical connector 118 that is connected to a given port 138 using that port's storage-device interface. The software 140 and programmable processor 142 can be implemented in the manner described in the US provisional patent applications and US non-provisional patent applications cited herein. One example of such a storage device and interface are the storage devices and interfaces used in the QUAREO™ family of physical layer management products that are commercially available from TE Connectivity.

In the example shown in FIG. 1, each patch panel port 138 in the first fiber patch panel 108 is communicatively coupled to a respective patch-panel port 138 in the second fiber patch panel 108 via an optical trunk cable 144. The optical trunk cable 144 is a multiple-fiber cable, where each duplex port 138 of each of the fiber patch panels 108 is connected to a respective pair of fibers in the trunk cable 144. The trunk cable 144 includes a multi-fiber connector 146 (for example, a suitable MPO or MTP connector) at each end of the cable 144. Each fiber patch panel 108 includes a trunk connector 148 (for example, a suitable MPO or MTP connector) designed to be connected to the multi-fiber connector 146 attached to the trunk cable 144.

In this example, each multi-fiber connector 146 attached to the optical trunk cable 144 also includes or is otherwise associated with a respective storage device 150, and the connectors 146 and 148 include or are otherwise associated with a respective storage-device interface (not shown) by which the software 140 running on each fiber patch panel 108 can read and write data to the storage device 150. The storage devices 150 that are included in or otherwise associated with the multi-fiber connectors 146 attached to the trunk cable 144 are also referred to here as the "trunk-cable" storage devices 150. The storage-device interface can be implemented as described in the manner described in the US provisional patent applications and US non-provisional patent applications cited herein.

In other implementations, the trunk cable 144 plugged into the first patch panel 108 is different from the trunk cable 144 plugged into the second patch panel 108. In some implementations, the two trunk cables 144 may be connected at a third patch panel. In other implementations, the two trunk cables 144 may be connected using a panel network of multiple patch panels and trunk cables. In still other implementations, multiple trunk cables may extend between the first and second patch panels 108. For example, in some implementations, multiple single optical fiber cables may extend between the patch panels 108 or panel network. In other implementations, multiple multi-fiber cables may extend between the patch panels 108 or panel network.

Non-limiting examples of patch panels suitable for use as panels 108 are shown and disclosed in U.S. patent application Ser. No. 13/025,750 and United States Publication No. US 2011-0116748, which were incorporated by reference above. Other non-limiting examples of patch panels suitable for use as panels 108 are shown and disclosed in United States Publication No. US 2011-0115494 A1, filed Oct. 19, 2010, and titled "MANAGED ELECTRICAL CONNECTIVITY SYSTEMS," U.S. application Ser. No. 12/905,689, filed Oct. 15, 2010, and titled "MANAGED CONNECTIVITY IN ELECTRICAL SYSTEMS AND METHODS THEREOF," U.S. Provisional Patent Application Ser. No. 61/466,696, filed Mar. 23, 2011, and titled "CABLE MANAGEMENT IN RACK SYSTEMS," and U.S. Provisional Patent Application Ser. No. 61/476,041, filed Apr. 15, 2011, and titled "MANAGED ELECTRICAL CONNECTIVITY SYSTEMS," which are hereby incorporated by reference herein in their entirety.

In the example shown in FIG. 1, the system 100 further comprises a physical layer domain (PLD) management entity 152. The PLM domain management entity 152, switches 104, 105, and fiber patch panels 108 communicate with one another over a network 156. The PLM domain management entity 152 is typically implemented as software that runs on a computer that is coupled to the network 156. The computer on which the PLM domain management entity 152 is implemented includes an appropriate network interface to communicatively couple the computer to the network 156. In the example shown in FIG. 1, the programmable processors 136, 137 and 142 in the switches 104, 105 and fiber patch panels 108, respectively, are communicatively coupled to the network 156 by including a respective "management" or "non-service" port 158 that is separate from the "service" ports 106 and 138. However, one or more of the programmable processors 136, 137 and 142 in the switches 104, 105 and fiber patch panels 108, respectively, can be communicatively coupled to the network 156 using one or more of the "service" ports 106 and 138. In an example, the switches 104, 105 can communicate with the PLM domain management entity 152 using a suitable communication protocol (such as the Simple Network Management Protocol (SNMP) or a telnet session to obtain information via CLI).

In one embodiment, the network 156 comprises an INTERNET PROTOCOL network. The network 156 can be implemented using one or more of a local area network (LAN), a wide area network (WAN), the INTERNET, a virtual local area network (VLAN), and a virtual private network (VPN), an enterprise network, and a telecommunication service provider network. Moreover, the switches 104 and fiber patch panels 108 can be a part of the equipment used to implement the network 156.

The PLM domain management entity 152 is configured to receive physical layer information pertaining to various devices and media used to implement the physical layer in the network 156 (not just the physical communication media 110). The physical layer information can be sent to the PLM domain management entity 152 over the non-service ports 106, 138. Physical layer information may also be manually supplied to the PLM domain management entity 152.

The physical layer information (PLI) includes information about various devices in the network 156 (for example, information about the active optical modules 102, switches 104, and fiber patch panels 108) (also referred to here as "device information") as well as information about any physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various physical communication media (for example, from the storage devices 132 that are attached to the physical communication media 110 and storage devices 150 that are attached to the optical trunk cables 144).

Examples of media information that can be stored in such storage devices 132, 150 include, without limitation, a cable identifier that uniquely identifies that particular physical communication media (similar to an ETHERNET Media Access Control (MAC) address but associated with the physical communication media (e.g., a serial number for the physical communication media)), a cable end identifier that identifies one end of the physical communication media from the other, a port insertion count, a cable end insertion count, as well as attribute information such as a part number, a plug or other connector type, a cable or fiber type (e.g., single mode, multimode) and length, fiber rating (e.g., om2, om3, om4, etc.), a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices as media information. For example, the media information can include testing, media quality, or performance information stored in such storage devices. The testing, media quality, or performance information, for example, can be the results of testing that is performed when a particular physical communication media is manufactured or installed.

The physical layer information can also include information about physical communication media that does not have any storage devices 132, 150 attached to it.

The PLM domain management entity 152 includes the functionality for managing the PLM itself or is a local agent for a remotely located management system. The PLD management system includes a database or other data store (not shown) for storing the physical layer information provided to it. The PLD management system also includes functionality that provides an interface for external devices or entities to access the physical layer information maintained by the PLD management system. This access can include retrieving information from the PLD management system as well as supplying information to the PLD management system. In this example, the PLD management system is implemented as "middleware" that is able to provide such external devices and entities with transparent and convenient access to the PLI maintained by the PLD management system. Because the PLD management system aggregates PLI from the relevant devices in the network 156 and provides external devices and entities with access to such PLI, the external devices and entities do not need to individually interact with all of the devices in the network 156 that provide PLI, nor do such devices need to have the capacity to respond to requests from such external devices and entities.

The PLD management system, in this example, implements an application programming interface (API) by which application-layer functionality can gain access to the physical layer information maintained by the PLD management system using a software development kit (SDK) that describes and documents the API.

The PLD management system can aggregate the PLI from the devices and physical communication media to associate ports of devices (e.g., patch panels) with physical communication media. For example, the PLI can be used to associate a given port of a device with a given physical communication media and/or a particular connector of the physical communication media. Aggregating the PLI can include aggregating multiple such associations to determine physical layer connections between devices.

More information about physical layer information, the PLM domain management entity 152, and the PLD management system can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705, 497, filed on Feb. 12, 2010, titled "AGGREGATION OF PHYSICAL LAYER INFORMATION RELATED TO A NETWORK", both of which are hereby incorporated herein by reference.

Figure 2:
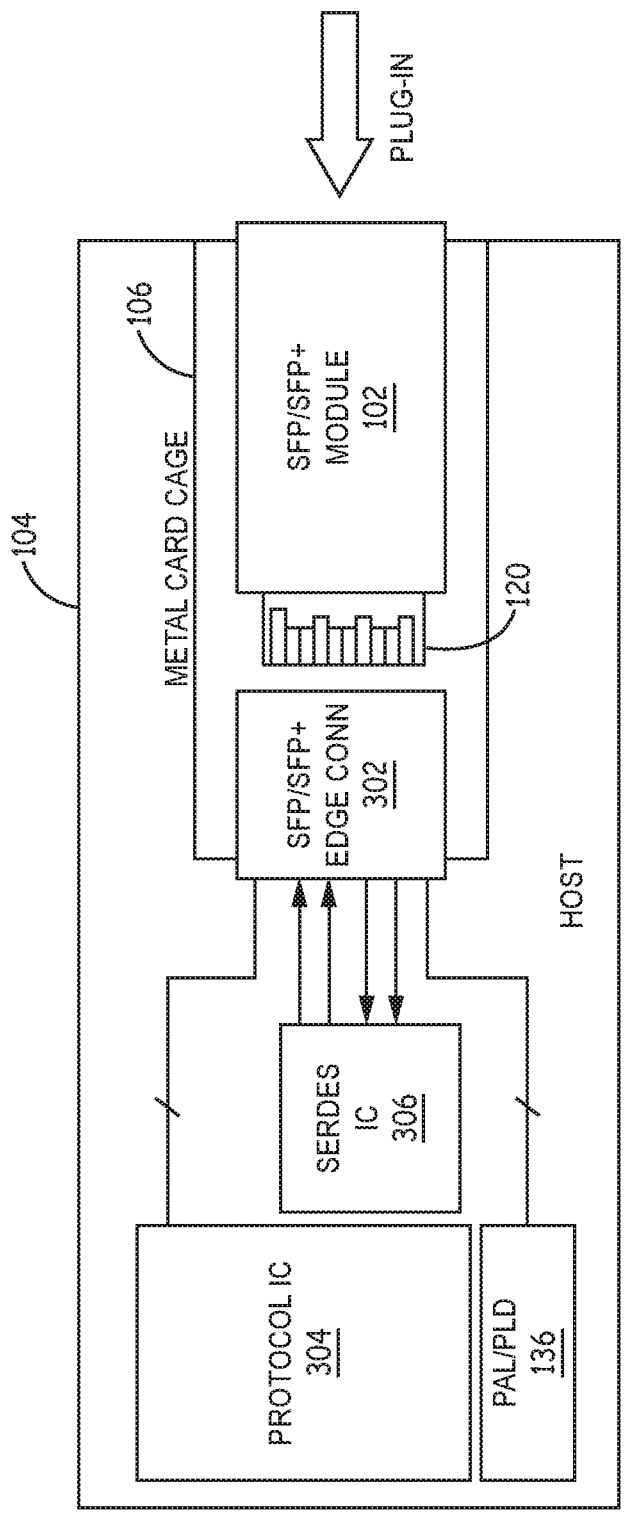
FIG. 2 is a block diagram of an exemplary embodiment of an AOM and network element.

FIG. 2 illustrates a block diagram of an example active optical module 102 and network element 104, 105 suitable for use in the system of FIG. 1. The active optical module 102 is configured to be physically inserted into a port 106 of the network element 104, 105. Each active optical module 102 includes an electrical connector 120 by which transmit and receive signals are input and output in electrical form (typically, as respective differential signal pairs) between the active optical module 102 and the network element 104, 105 having the port 106 in which the active optical module 102 is inserted. The electrical connector 120 also includes contact traces for power (PWR) and (GND) lines for providing power and ground to the active components in the active optical module 102.

The electrical connector 120 of the active optical module 102 mates with an edge card connector 302 of the port 106 of the network element 102. The connection between the edge card connector 302 of the network element 104, 105 and the electrical connector 120 of the active optical module 102 provides the electrical connection for signal, power, and data between the network element 104, 105 and the active optical module 102.

The network element 104, 105 includes a protocol integrated circuit 304 that is coupled to a first subset of contacts in the edge card connector 302 and is configured to communicate with the controller 250 in the transceiver 222 of the active optical module 102 to control the electrical/optical conversion in the transceiver 222. A serializer/deserializer (SERDES) 306 in the network element 104, 105 is coupled to a second plurality of contacts in the edge card connector 302 and provides transmit and receive signal paths for high speed data between the network element 104, 105 and the active optical module 102. The receiver lines (RD+, RD−) are the differential receiver inputs to the SERDES 306 from the transceiver 222 of the active optical module 102. In an example, the receiver lines are AC coupled 100 Ohm differential lines which are terminated at the SERDES 306. The transmitter lines (TD+, TD−) are the differential transmitter outputs from the SERDES 306 to the transceiver 222 of the active optical module 102. In an example, AC coupling for the transmitter and receiver lines is done inside the active optical module 102.

The network element 104, 105, also includes a programmable processor 136, 137 (such as a programmable array logic (PAL), programmable logic device, microcontroller, or microprocessor) that is coupled to a second subset of contacts in the edge card connector 302 and is configured to implement an inventory interface (identified in FIG. 3 as 402) over the second subset of contacts. The inventory interface 402 is configured to inter-operate with a complimentary inventory interface 402 in each of the active optical modules 102. The inventory interface 402 is a hardware interface designed for authenticating an active optical module connected to the corresponding port 106. The hardware for and electrical signals communicated over the inventory interface 402 are specified by the MSA corresponding to the active optical modules discussed above. Examples of MSAs corresponding to the inventory interface 402 include MSA INF-8074i SFP—SFP (Small Formfactor Pluggable) Transceiver, Rev 1.0, SFF Committee, 2001; MSA SFF-8089 SFP—SFP Rate and Application Codes, Rev 1.3 SFF Committee, 2005; MSA SFF-8431 SFP+—Enhanced Small Form Factor Pluggable Module SFP+, Rev. 4.1, SFF Committee; MSA SFF-8432—Improved Pluggable Formfactor Mechanical Specification for Improved Pluggable Formfactor, Rev 5.1, SFF Committee, 2012; and MSA SFF-8472—Digital Diagnostic Monitoring, Diagnostic Monitoring Interface for Optical Transceivers, Rev. 11.3, SFF Committee, 2013. Future MSAs are also included. In accordance with the relevant MSA, software 134, 135 executing on the programmable processor 136, 137 associated with each network element 104, 105 is configured to read and write data to and from a storage device included in each active optical module 102 in order to perform authentication of the active optical module 102 that is connected to a given port 106 using that port's inventory interface 402. The software 134, 135 and programmable processor 136, 137 are implemented in a conventional manner except as described here.

Figure 3:
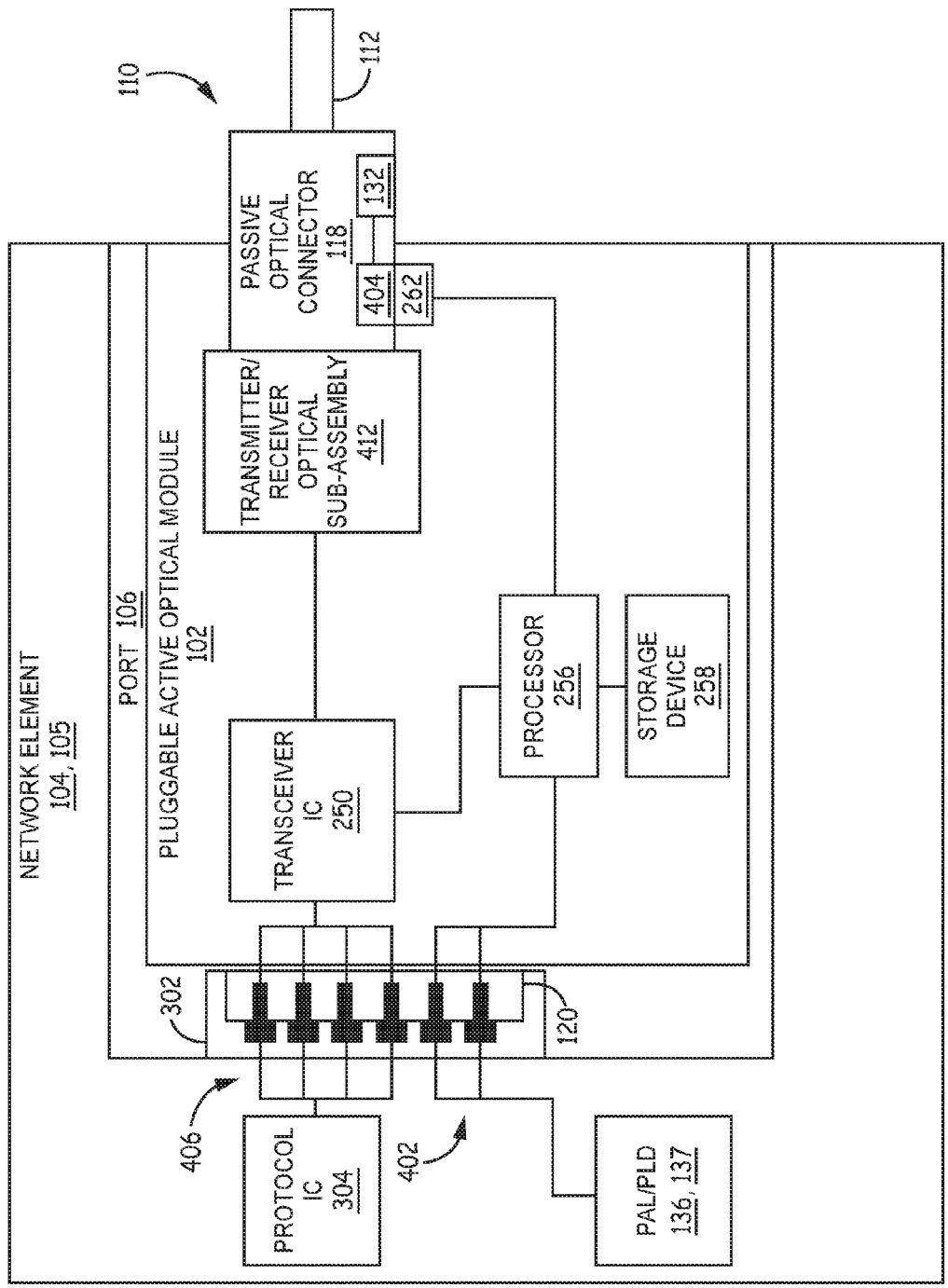
FIG. 3 is a block diagram of an exemplary embodiment of an AOM that is inserted into a port of a network element and a PCM connected to the AOM.

FIG. 3 is a block diagram of an example active optical module 102 that is inserted into a port 106 of a network element 104, 105, and a physical communication media (PCM) 100 is connected to the active optical module 102. The PCM 110 shown in FIG. 2 can be a fiber optical cable having one or more fibers 112. Any appropriate type of fiber optic cable can be used including simplex cables and/or simplex or duplex cables that implement more than one simplex or duplex optical channel.

A first end of the physical communication media 110 is shown in FIG. 1, and is connected to the active optical module 102. The first end of the PCM 110 includes a passive fiber optic connector 118 attached thereto. The passive optical connector 118 can be connected to an optical adapter of the pluggable active optical module 102 for communication with a network element 104, 105. The passive optical connector 118 can pass optical signals between the fiber(s) 112 in the PCM 110 and the active optical module 102. The active optical module 102 includes the active optical components that perform the electrical-to-optical (E/O) and optical-to-electrical (O/E) conversions for signals to be sent and received over the fiber(s) 112 of the PCM 110 to and from a network element 104, 105. The second end (not shown) of the PCM 110 can include either a passive fiber optic connector or active optical connector.

One example of a passive optical connector 118 is a duplex LC, SC, or MPO fiber connector. In other examples, the physical communication media 110 can be implemented in other ways (such as a simplex cable, a hybrid cable, a multi-channel cable, etc.), and the passive optical connector 118 is implemented in a manner suitable for that type of cable (for example, using a simplex connector, a hybrid cable connector, or a multi-channel cable connector).

In any case, a passive optical connector 118 on a PCM 110 can be connected to a pluggable active optical module 102 for passing optical signals to/from the PCM 110 to the pluggable active optical module 102. The active optical module 102 includes an optical adapter configured to mate with the passive optical connector 118. The optical adapter and the passive optical connector 118 are configured such that when the passive optical connector 118 is inserted into the adapter 260, optical signals can be coupled between the active optical module 102 and the physical communication media 110. The optical adapter 260 have any suitable form such as a duplex LC, SC, or MPO adapter.

The active optical module 102 includes the active optical components that perform the electrical-to-optical (E/O) and optical-to-electrical (O/E) conversions necessary for signals to be sent and received over the fiber(s) 112 of the PCM 110 connected to the active optical module 102. The active optical module 102 includes an optical transceiver that includes a transmitter/receiver optical sub-assembly 412 for transmitting and receiving optical signals from and to the fiber(s) of the PCM 110. The transmitter/receiver optical sub-assembly 412 can include a receiver optical sub-assembly (ROSA) that receives a first optical signal from the fiber(s) 112 and is part of the path that produces a first (received) electrical signal from the first optical signal suitable for outputting from the electrical connector 120. Such a transmitter/receiver optical sub-assembly 412 further comprises a transmitter optical sub-assembly (TOSA) that in the path that receives the electrical transmit signal from the electrical connector 120 and outputs a second (transmit) optical signal for communicating over the fiber(s) 112. In other examples, a bidirectional optical sub-assembly (BOSA) can be used in place of TOSA and ROSA.

The received electrical signal and the transmit electrical signal can be output/supplied to the electrical connector 120. In an example, the received electrical signal is output on the electrical connector 120 as a differential pair of electrical signals (RX+ and RX−) that complies with one or more of the IEEE 802.3 family of standards relating to 10 or 40 Gigabit ETHERNET. Likewise, the transmit electrical signal to be transmitted on the physical communication media 110 is supplied on the electrical connector 120 as a differential pair of electrical signals (TX+ and TX−) that complies with one or more of the IEEE 802.3 family of standards relating to 1, 10, or 40 Gigabit ETHERNET. The transceiver also includes a controller 250 for controlling the operation of the transmitter/receiver optical sub-assembly 412. The controller 250 can include any suitable ASIC and can be coupled to one or more lines on the electrical connector 120 for communication with a network element 104, 105.

In an example, the active optical module 102 comprises a Gigabit ETHERNET active optical module that implements one or more of the Institute of Electrical and Electronics Engineers (IEEE) 802.3 family of standards relating to 1, 10, or 40 Gigabit ETHERNET. In this example, the electrical connector 120 is implemented as an edge-type connector having contact traces for each of the lines required by the Gigabit ETHERNET standards relating to electrical Gigabit ETHERNET connectors (that is, TX− and TX+ contact traces for the "transmit" differential signal pair and RX− and RX+ contact traces for the "receive" differential signal pair). In one common application, the specifications for the active optical module 102 are not standardized by any official standards body but are specified by a multi-source agreement (MSA) between competing manufacturers. This is also referred to here as a "MSA compatible active optical module" or "MSA compatible transceiver". The electrical connector 120 and the rest of the active optical module 102 can be any suitable connector and module such as small form factor connectors and modules including MSA compatible connectors and modules such as a SFP, SFP+, QSFP, QSFP+, CFP, and CXP conforming connectors and modules as well as other types of active optical modules (for example, active optical modules other than MSA compatible active optical modules). Examples of MSAs corresponding to the active optical module 102 include MSA INF-8074i SFP—SFP (Small Formfactor Pluggable) Transceiver, Rev 1.0, SFF Committee, 2001; MSA SFF-8089 SFP—SFP Rate and Application Codes, Rev 1.3 SFF Committee, 2005; MSA SFF-8431 SFP+—Enhanced Small Form Factor Pluggable Module SFP+, Rev. 4.1, SFF Committee; MSA SFF-8432—Improved Pluggable Formfactor Mechanical Specification for Improved Pluggable Formfactor, Rev 5.1, SFF Committee, 2012; and MSA SFF-8472—Digital Diagnostic Monitoring, Diagnostic Monitoring Interface for Optical Transceivers, Rev. 11.3, SFF Committee, 2013. Future MSAs are also included.

As mentioned above, the active optical module 102 includes one or more integrated circuits that implement a transmitted/receiver optical sub-assembly 412 and controller 250 (such as a VCSEL driver) for transmitting and receiving optical signals over the PCM 110. The controller 250 can send and receive signals with a network element 104, 105 through a transceiver interface 406. The transceiver interface 406 can be implemented over one or more contacts of the electrical connector 120 discussed above. The controller 250 is coupled to a transmitter/receiver optical sub-assembly 412 and is configured to control the transmitter/receiver optical sub-assembly 412 to transmit and receive optical signals.

The controller 250 converts current mode logic (CML) transmitter (TD) inputs from the SERDES 306 of a network element 104, 105 into a drive signal for a VCSEL or laser diode (electrical to electrical conversion). The controller 250 also controls the biasing levels to insure that the VCSEL or laser diode is operating in lasing mode. The controller 250 also converts the signal from the transmitter/receiver optical sub-assembly and drives the CML lines for the receiver (RD) output (electrical to electrical conversion).

The active optical module 102 includes an inventory interface 402 that mates and interoperates with a corresponding inventory interface 402 on the network element 104, 105. As discussed above, the inventory interface 402 is designed for use in authenticating the active optical module 102 to the network element 104, 105. Typically, authenticating the active optical module 102 includes providing an identifier for the active optical module 102 to the network element 104, 105. Using the identifier, the network element 104, 105 can verify that the active optical module 102 is an acceptable type of active optical module 102 among other things. This authentication is part of a networking management system domain. The networking management system domain is managed by the network management entity 154 and includes obtaining and receiving information (e.g., in the form of SNMP messages) from the active network elements in the system 100. Other information in addition to an identifier for the active optical module 102 can also be provided to the network element 104, 105.

Each PCM 110 in the system 100 can be a managed PCM or an unmanaged PCM. As used herein a managed PCM is a PCM that includes (or is otherwise associated with) one or more storage devices (e.g., storage device 132) along with a native PLM storage-device interface that is designed to be used by a physical layer management system to read and write information to the storage device. Typically, a managed PCM would have a separate storage device and native PLM storage-device interface on each connector. An unmanaged PCM is a PCM that does not include such a storage device or native PLM storage-device interface.

The example shown in FIG. 3 illustrates a managed PCM 110 connected to the active optical module 102. The passive optical connector 118 of the managed PCM 110 includes (or is otherwise associated with) storage device 132 as well as storage-device interface 404 via which the storage device 132 can be accessed. This storage-device interface can be implemented by incorporating appropriate electrical contacts in the passive optical connector 118.

Various examples of native PLM storage-device interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line storage-device interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and interface are the storage devices and interfaces used in the QUAREO™ family of physical layer management products that are commercially available from TE Connectivity.

Typically, a non-physical layer management configured active optical module would include a storage device coupled to the inventory interface 402. Such a storage device would include the information needed for authentication of the active optical module such as an identifier that was configured according to the authentication protocol. The network element 104, 105 would access such a storage device in the active optical module over the inventory interface 402 in accordance with the relevant MSA and/or standard. Such a non-physical layer management configured active optical module would not be able to access the storage device 132 in the passive optical connector 118.

The active optical module (AOM) 102 shown in FIG. 3, however, is configured to obtain physical layer management (PLM) information from a storage device (e.g., storage device 132) associated with a connector (e.g., connector 118) connected to the optical adapter of the active optical module 102. As used herein "PLM information" refers to information that is specifically intended for use by the PLM domain management entity 152 (or, more generally, a PLM system).

To obtain the information from the storage device 132, the active optical module 102 includes a programmable processor 256 coupled to an AOM storage device 258. The programmable processor 256 can include any suitable programmable processor, such as a microprocessor, and the storage device 258 can be on a separate IC or can be incorporated one the same IC as the programmable processor 256. In an implementation of this example, the storage device 258 is an EEPROM, however, in other implementations other non-volatile memory can be used. The programmable processor 256 is configured to access the storage device 132 through a storage-device interface 262 associated with the optical adapter. The storage-device interface 262 is configured to mate and inter-operate with the native PLM storage-device interface 404 used in the passive optical connector 118 of the physical communication media 110. Software executing on the programmable processor 256 of the active optical module 102 is able to read and write data from and to the storage device 132 associated with any appropriate passive optical connector 118 that is connected to the optical adapter using the storage-device interface 262. The software and programmable processor 256 can implement reading and writing to the storage device 132 in the US provisional patent application and US non-provisional patent applications cited herein.

Notably, the native PLM storage-device interface 262 is a different hardware interface than the inventory interface 402. The native PLM storage-device interface 262 is configured to mate-and-interoperate with a native PLM storage-device interface (e.g., interface 404) on a connected inserted into the optical adapter of the active optical module. The native PLM storage-device interface 262 is intended for use by a PLM system to obtain and provide PLM information. Thus, the native PLM storage-device interface is an interface between the active optical module 102 and a connector (e.g., passive optical connector 118) on a PCM 110. The inventory interface 402 of the active optical module 102, in contrast, is an interface configured to mate-and-interoperate with a corresponding inventory interface 402 on a network element 104, 105. The inventory interface 402 is intended for use by the network element for authentication of the active optical module 102 and for network management domain related activities. The inventory interface is an interface between the active optical module 102 and the network element 104, 105 that is governed by one or more MSAs and/or standards corresponding to the active optical module 102 as discussed above.

The programmable processor 256 is configured to access the storage device 132 through the storage-device interface 262 associated with the adapter 260. The storage-device interface 262 is configured to mate and inter-operate with the native PLM storage-device interface 404 used in a passive optical connector 118 of a given physical communication media 110. Software executing on the programmable processor 256 of the active optical module 102 is able to read the write data from and to the storage device 132 associated with any appropriate passive optical connector 118 that is connected to the adapter 260 using the storage-device interface 262. The software and programmable processor 256 can implement reading and writing to the storage device 132 in the US provisional patent application and US non-provisional patent applications cited herein. Accordingly, the programmable processor 256 can obtain PLM information from the storage device 132 associated with the passive optical connector 118 when the passive optical connector 118 is inserted into the adapter 260.

Media information obtained from the storage device 132 by the processor 256 can be stored in the AOM storage device 258 as PLM information. The storage device 258 can also include PLM information generated/maintained by the AOM 102, such as information indicating that a connector/cable connected to the AOM 102 is unmanaged. The storage device 258 can also include PLM information that pertains to the AOM 102 itself.

The storage device 258 of the AOM 102 also includes the information that is used for authenticating the AOM 102, and any other information used in the network management system domain. This information is referred to herein as active optical module (AOM) information. The AOM information is information intended for use by the network element 104, 105 or a management system that is used to manage the network element 104, 105. Typically, the AOM information is information that is prescribed by a manufacturer of the network element 104, 105 and is controlled, at least in part, by the MSA corresponding to the AOM 102.

As discussed above, the AOM information can be used for authenticating the active optical module 102 to the network element 104, 105. Many types of network elements 104, 105 require an active optical module 102 to be authenticated before the ports 106 can be enabled for use with those active optical modules 102. The authentication could also be performed by a device other than network element 104, 105. Example AOM information includes performance, calibration, boot firmware, and vendor proprietary information for the AOM 102. The AOM information can include an AOM identifier (for example, a serial number) that uniquely identifies the active optical module 102 of which the corresponding storage device 258 is a part. The AOM information can also include attribute information such as the bandwidth of the cable (for example 1 Gigabit, 10 Gigabit, 25 Gigabit, etc.) and a communication protocol(s) for which the active optical module 102 was designed. "AOM information" refers to information that is intended for purposes other than use by a PLM domain management entity 152 (or, more generally, a PLM system).

The programmable processor 256 of the PLM configured AOM 102 is configured to emulate a storage device of a non-PLM configured AOM 102 for authentication and network management system purposes. To emulate a storage device of a non-PLM configured AOM 102, the AOM 102 is configured to send and receive data over the inventory interface 402, as though a storage device of a non-PLM configured AOM 102 were coupled to inventory interface 402. Thus, the processor 256 of the AOM 102 implements the active optical module 102 side electrical signals for the inventory interface 402.

To accomplish this, the processor 256 of the AOM 102 is coupled to the subset of contacts on the edge connector 120 corresponding to the inventory interface 402. The subset of contacts can include one "data" contact (DATA) and one "clock" contact (CLK) over which data and clock signals are sent by the programmable processor 136, 137 of the network element 104, 105. In an example, the inventory interface 402 is a serial communication interface. In some examples, the programmable processor 136, 137 implements the I²C (I-squared-C) bus protocol over the inventory interface 402. In such examples, the processor 256 of the AOM 102 is configured to respond to the programmable processor 136, 137 of the network element 104, 105 in accordance with the I²C bus protocol as a storage device of a non-PLM configured AOM 102 would respond.

Typically, a network element 104 to which the AOM 102 is coupled, is not configured to interact in the PLM system domain. Such a network element 104 is also referred to herein as a "non-native PLM domain network element" or simply a "non-native network element"). A non-native PLM domain network element 104 only includes software for use in interacting with the pluggable AOM 102 in ways that are specified in the relevant MSA and/or standard corresponding to the AOM 102. Thus, a non-native network element 104 is not configured to interact with (i.e., does not include hardware and/or software intended for the purpose of interacting with) the pluggable AOM 102 to obtain PLM information therefrom or to provide PLM information thereto. Such a non-native network element 104 is configured to directly access a storage device of a non-PLM configured pluggable AOM through the inventory interface 402 to obtain the AOM information stored in the storage device of the non-PLM configured AOM. In the example shown in FIG. 1, network element 104 is a non-native PLM domain network element that includes networking software 161 intended to provide the core functionality (e.g., switching, routing, etc.) of the network element 104 within the system 100.

As mentioned above, the pluggable AOM 102 is configured to interact with a non-native network element 104 by emulating a storage device of a non-PLM configured pluggable AOM. In order to obtain information from a non-PLM configured AOM, a non-native network element 104 is configured to provide a read request for a memory address of a non-native storage device over the inventory interface 402 in accordance with the relevant MSA/standard. A storage device of the non-PLM configured AOM would then send the information in the requested memory address to the non-native network element 104 over the inventory interface 402. Similarly, in order to store information in a storage device of a non-PLM configured AOM, a non-native network element 104 is configured to provide a write request including information and a memory address of the storage device of the non-PLM configured AOM over the inventory interface 402 in accordance with the relevant MSA/standard. The storage device of the non-PLM configured AOM would then store the information in the memory address provided.

By emulating a storage device of a non-PLM configured AOM over the inventory interface 402, the programmable processor 256 can be transparent to the non-native network element 104. For example, in response to a read request from a non-native network element 104, the programmable processor 256 of the pluggable AOM 102 can access the storage device 258 to obtain data corresponding to the memory locations or fields identified in the read request and respond with the data in a format as though the data were from a storage device of a non-PLM configured AOM 102. In response to a write request from the non-native network element 104, the programmable processor 256 can store the corresponding information in the storage device 258 and indicate to which memory address (of the non-PLM configured AOM) the information corresponds.

The information in a storage device of a non-PLM configured AOM is organized into a plurality of fields. The fields typically include fields that are required by the relevant standard or MSA (also referred to here as "required fields") and fields that are identified, but not required by the relevant standard or MSA (also referred to here as "user defined fields"). Example relevant standards and MSAs include standards and MSAs for SFP, SFP+, QSFP, QSFP+, CFP, and CXP active optical modules discussed above.

Figure 4A:
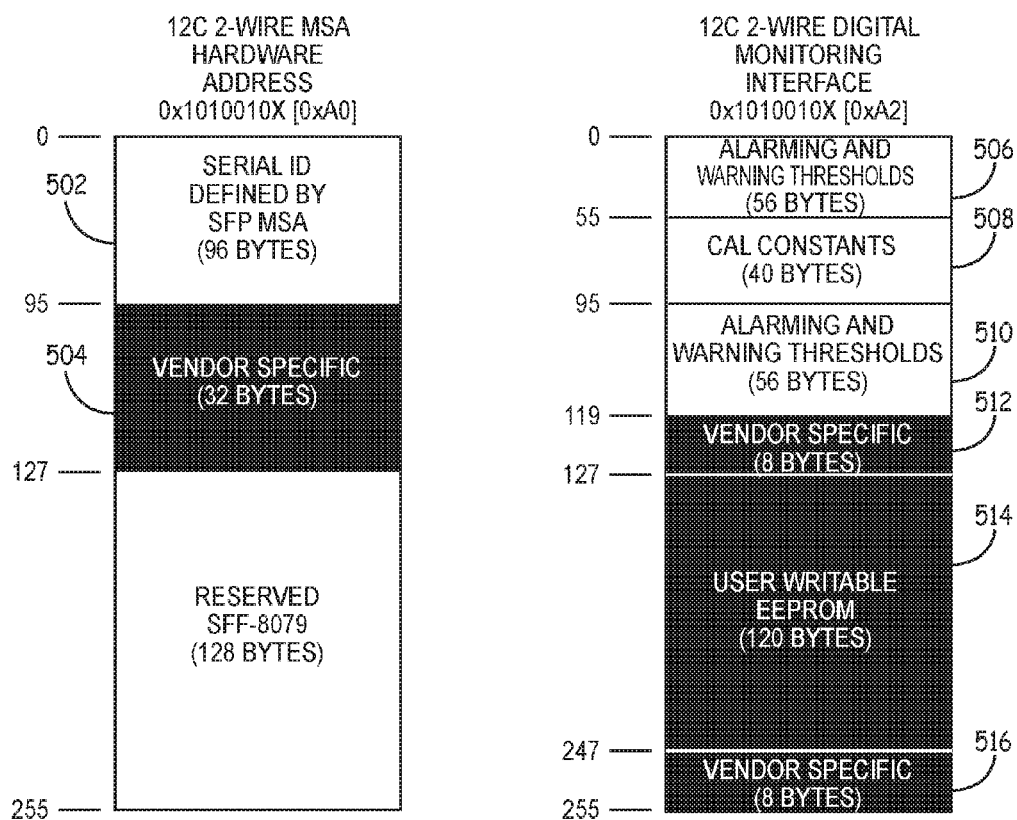
FIG. 4A is an exemplary embodiment of a field allocation of an MSA/standard for a storage device of a non-PLM configured SFP/SFP+ AOM.

FIG. 4A illustrates an example field allocation of an MSA/standard for a storage device of a non-PLM configured SFP/SFP+ AOM. FIG. 4A illustrates a first field 502 allocated to bytes 0-95 of hardware address 0xA0 and a second field 504 allocated to bytes 95-127. The first field 502 is a required field used for the AOM identifier of the pluggable AOM 102. The second field 504 is a user defined field allocated by the MSA. FIG. 4A also illustrates a second plurality of fields allocated by a standard (e.g., the digital monitoring interface standard) at hardware address 0xA2 in addition to the fields allocated by the MSA. The second plurality of fields also include several required fields 506, 508, 510, as well as several user defined fields 512, 514, 516. A non-native network elements 104 that supports SFP, but not SFP+ would support only the MSA allocated fields at hardware address 0xA0, while a non-native network element 104 that supports both SFP and SFP+ would support both the MSA allocated fields as well as the standard allocated fields at hardware address 0xA2.

Figure 4B:
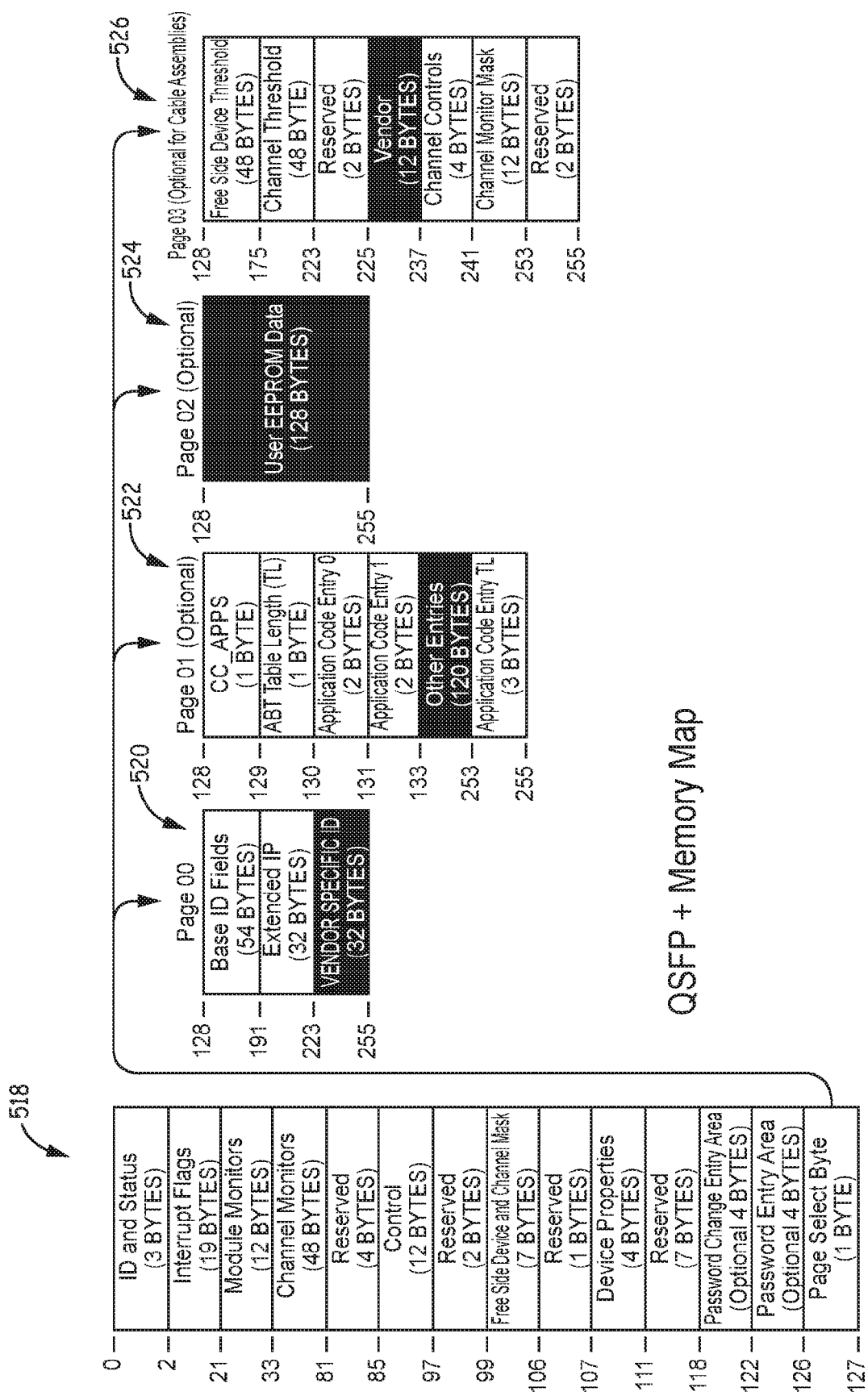
FIG. 4B is an exemplary embodiment of a field allocation provided by a MSA for a storage device of a non-PLM configured QFSP+ AOM.

FIG. 4B illustrates another example field allocation provided by a MSA for a storage device of a non-PLM configured QSFP+ AOM. This field allocation includes multiple "pages" that can be accessed through a single address. In this example, the address is 0xA0. The single address includes 256 bytes of storage. The first 128 bytes (0-127) of storage are allocated as shown at 518. Byte 126 is a field that is allocated to the page select byte. The number in the byte indicates the page that is accessed by the remaining 128 bytes of the single address. Thus, if the page select byte is 00, page 00 is accessed. The MSA specifies page 00 (520), page 01 (522), page 02 (524), and page 03 (526) as potential pages that can be accessed through the page select byte. Each page 00, 01, 02, 03 has a defined field allocation as shown in FIG. 4B.

To emulate a storage device of a non-PLM configured AOM that conforms to a standard or MSA allocated field organization, the programmable processor 256 can implement a virtual table including the fields allocated by the MSA/standard. That is, the programmable processor 256 can be configured to receive a request (for example, a read request or write request) from a network element 104, wherein the request is formatted in accordance with the MSA/standard for a non-PLM configured AOM, and the processor 256 can take and action and/or provide a response to the non-native network element 104 such that the action/response complies with the MSA/standard. For example, in response to a request to read a memory address corresponding to a particular field, the processor 256 can be configured to obtain the information corresponding to that memory address/field (e.g., from the storage device 258) and provide the information to the non-native network element 104. In this way, the AOM 102 can provide AOM information to the non-native network element 104 in compliance with the relevant MSA/standard.

In addition to the AOM information provided in accordance with the relevant MSA/standard, the programmable processor 256 of the pluggable AOM 102 is also configured to provide and receive PLM information over the inventory interface 402. The processor 256 can provide and receive PLM information to the non-native network element 104 in a manner that is transparent to the non-native network element 104. That is, the non-native network element 104 is not aware that it is providing or receiving PLM information. Instead, the AOM 102 utilizes communications conforming to the MSA/standard for the AOM 102 to transparently insert and receive PLM information.

For example, in read requests from the non-native network element 104, the AOM 102 can generate a response corresponding to the information for the one or more table entries (memory addresses) of the read request in accordance with the relevant MSA/standard. If there is any space (e.g., bytes) in the one or more table entries that is not used for AOM information, the processor 256 of the AOM 102 can insert PLM information in that space. Thus, the PLM information will be provided to the non-native network element 104 in response to the read request. The non-native network element 104, will not know that the PLM information is there. The non-native network element 104 will merely take whatever action it was going to take after receiving the response to the request. Oftentimes, the AOM information obtained by a non-native network element 104 from an AOM is stored on a local storage device or memory on the non-native network element 104.

In an example, the AOM information is stored in a management information block (MIB) or the like at the network element 104 and/or a network management system domain manager 154. Such a MIB is intended network management system domain purposes. The AOM information can be stored in a MIB by an SNMP agent running on the non-native network element 104. The AOM information stored in the MIB can include the AOM identifier discussed above. The non-native network element 104 can also store other information such as a connection table, routing table, media access control (MAC) addresses of other device, network element MAC address, network element identifier that the non-native network element 104 is provided with or learns from other devices such as through a spanning tree protocol. This other information is also referred to herein as "other network element information".

Since the processor 156 inserted the PLM information into unused space in the field(s), the PLM information is (automatically) stored in the MIB along with the AOM information. For example, PLM information that is included in a require field such as the AOM identifier field, is stored in the MIB along with the AOM identifier obtained during the read request for that field. PLM information that is included in a user defined field is treated according to protocol for that user defined field (e.g., stored in an appropriate MIB).

The PLM domain management entity 152 can obtain the PLM information from the non-native network element 104 (or network management system domain manager 154) by, for example, sending an SNMP request to the non-native network element 104 to obtain the MIB that has the PLM information stored therein, unknowingly, by the non-native network element 104. In some examples, the PLM domain management entity 152 can subscribe to particular network management system domain reports from the non-native network element 104 (or manager 154), wherein the reports subscribed to correspond to MIBs in which the PLM information is stored. Since the AOM information is governed by the MSA/standard, the unused spaces in the AOM table can be a-priori coordinated between the PLM domain management entity 152 and the PLM configured AOM 102. In this way, PLM information can be passed through the non-native network element 104 in a manner that is transparent to the non-native network element 104.

PLM information can also be transparently passed through the non-native network element 104 from the PLM domain management entity 152 to the PLM configured AOM 102 in a similar manner. For example, the PLM domain management entity 152 can send a write request to the non-native network element 104 to write information to one or more table entries corresponding to the MSA/standard, wherein the information is PLM information. The non-native network element 104 can write the information to the requested table entries in accordance with the MSA/standard.

In this way, any unused memory locations corresponding to a storage device of a non-PLM configured AOM, can be used for PLM information, and the AOM information can remain unaffected. These unused memory locations can include unused space within a required field and/or unused space within a user defined field. In an example, the PLM information is included with AOM information in one or more of the required fields of the relevant MSA/standard. For example, if the AOM information corresponding to a required field does not use all the memory space allocated to that field, the PLM information may be inserted in the unused memory space of that field. A required field that is defined for an AOM identifier (that is, a serial number) can be used by encoding information in that required field in a way that includes both the AOM identifier and the desired PLM information (for example, a cable identifier or universal code indicating no cable/connector connected). Moreover, the PLM information can be combined with the AOM information (e.g., the AOM identifier) in a manner that does not affect the use of the AOM information by the non-PLM processes of the network element 104.

In some examples where the PLM information is provided in manner such that the PLM information is included in one or more of the user defined fields of the relevant MSA/ standard. For example, the manufacturer of the physical communication media 110 can define one or more of the user defined fields as including various PLM information. A first user defined field can be defined as including a cable identifier (as discussed above), and the particular cable identifier for the associated cable is accordingly stored in this first user defined field. In one implementation, an extended memory map defined by an MSA (e.g., memory map positions 127-247) is used to write messages and commands to/from the active optical module 102. For example, a command may be written in the extended memory map to set the dual color port LED to solid green, amber, flash slow amber, or flash fast green, etc. This enables the PLD management system to create and perform work orders in a similar manner to panel work orders. Other commands include, for example, requesting the programmable processor 256 to invoke software download mode, enter normal operation, reset module, reset port insertion count, write a user defined value to storage device 138, request specific inventory information to be written to AOM, for example, manufacture info, enable or disable 'invalid cable type' processing, enable or disable the data path for invalid cable types.

Additional information regarding use of an AOM 102 with a non-native network element 104 can be found in U.S. patent application Ser. No. 13/926,378, filed on Jun. 25, 2013, titled "PHYSICAL LAYER MANAGEMENT FOR AN ACTIVE OPTICAL MODULE" (also referred to herein as the "'378 Application") and U.S. patent application Ser. No. 14/494,256, filed on Aug. 23, 2014, titled "PLUGGABLE ACTIVE OPTICAL MODULE WITH MANAGED CONNECTIVITY SUPPORT AND SIMULATED MEMORY TABLE" (also referred to here as the "'256 Application"), both of which are hereby incorporated herein by reference.

The same pluggable AOM 102 that is configured to interact with a non-native network element 104 can also be configured to interact with a network element 105 that is extended with software intended for PLM domain interactions. Such a network element is referred to herein as a "PLM domain extended network element" or simply an "extended network element". Network element 105 shown in FIG. 1 is an example of such an extended network element. As shown, extended network element 105 includes networking software 160 intended to provide the core functionality of the network element 105 as well as PLM software 162 intended to provide PLM domain interactions.

Figure 5A:
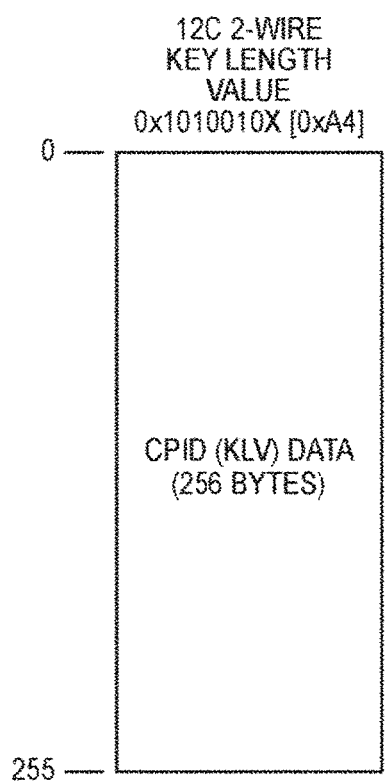
FIGS. 5A and 5B are exemplary embodiments of illustrations of a memory space of a non-standard table entry.
Figure 5B:
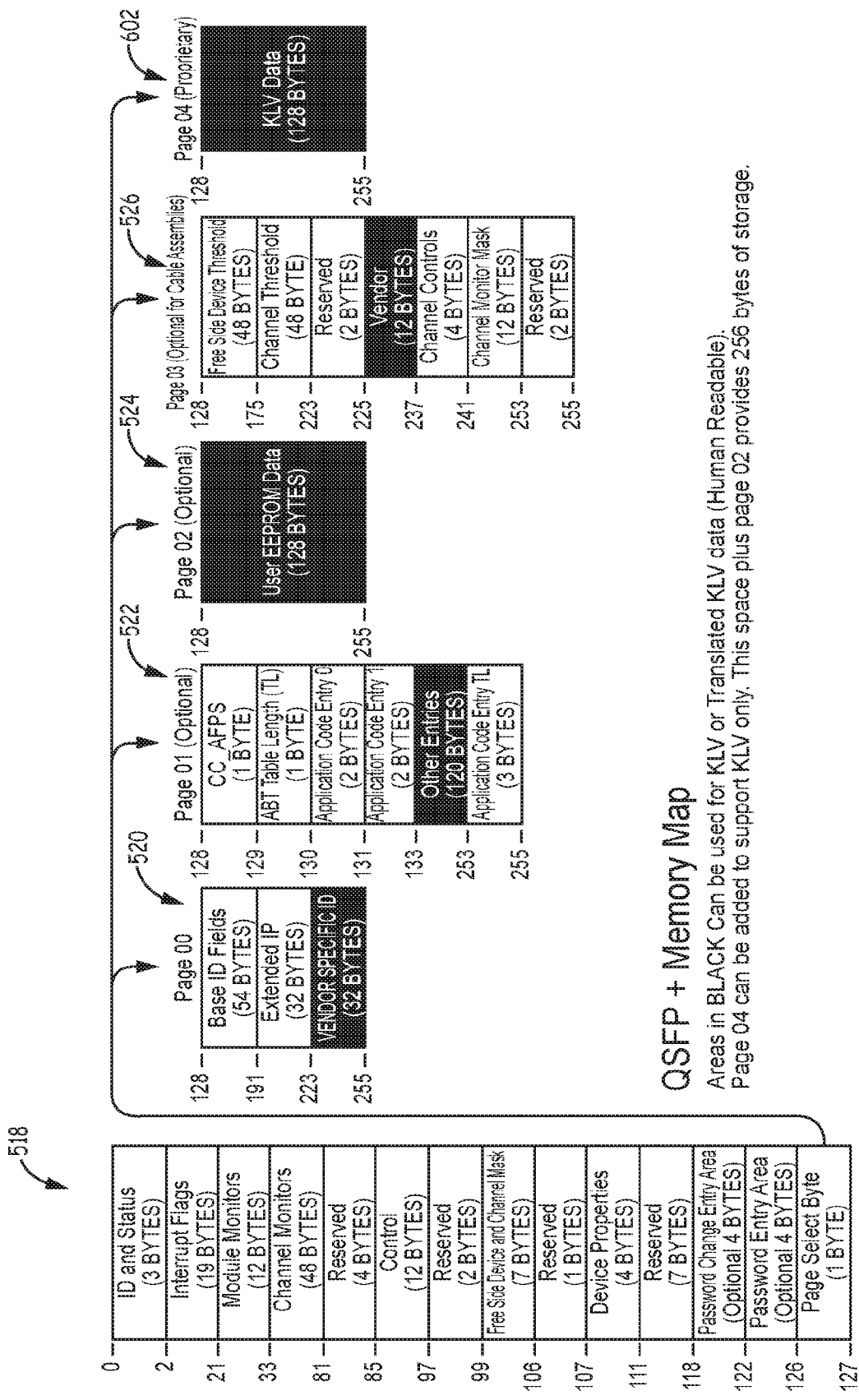

In a first example, the extended network element 105 is configured for PLM domain interactions with a PLM configured AOM 102. That is, in the first example, the extended network element 105 is configured for "south-bound" PLM domain interaction over the inventory interface 402. In such an example, the PLM software 162, when executed by the processing device(s) 137 of the extended network element 105, causes the extended network element 105 to send a read and/or write request to a non-standard table entry of the inventory interface 402. As used herein, a non-standard table entry is a table entry that is not allocated by the relevant MSA or standard corresponding to the inventory interface 402 (i.e., corresponding to the AOM). For example, if the relevant MSA for the inventory interface 402 specifies reads and writes to hardware address 0xA0 and the relevant standard for the inventory interface 402 extends the reads and writes to the 0xA2 address, a non-standard table entry is an address other 0xA0 and 0xA2, such as 0xA4. Advantageously, utilizing a table entry outside of the standard table entries enables additional space to be used for PLM information and commands. FIG. 5A is an illustration of a memory space of such a non-standard table entry. As shown, the entire memory space of this non-standard address (table entry) can be used for PLM (e.g., CPID) information. FIG. 5B is another illustration of a memory space of such a non-standard table entry. FIG. 5B corresponds to the QSFP+ allocation discussed in FIG. 4B. Since the MSA does not define any pages above 03, page 04 (602) is a non-standard table entry and, in this example, is used to provide 128 bytes of address space that can be used for PLM related activities.

In response to receiving a read and/or write request to a non-standard table entry, the AOM 102 can be configured to provide information and/or take an action based on a predefined PLM proprietary protocol. That is, because the request corresponds to a non-standard table entry, the AOM 102 is not required to comply with an MSA/standard for the format of the information. The AOM 102 may still be comply with the physical layer communication protocol in order to enable information to be transferred over the inventory interface 402. In an example, the physical layer communication protocol used for communication with respect to a non-standard table entry is implemented in accordance with the I²C protocol as discussed herein.

For example, the proprietary protocol can specify that in response to a read request to a certain non-standard table entry the AOM 102 will send to the extended network element 105 certain PLM information (e.g., an identified number of the storage device 132 of a passive optical connector 118, an insertion count for the passive optical connector 118, an indication that the passive optical connector is unmanaged, etc.). The proprietary protocol can specify that the AOM 102 will perform a certain action (e.g., flash an LED, write PLM information to a storage device 132, etc.) in response to receiving a write request to a certain non-standard table entry. As should be understood, any suitable protocol can be used.

As mentioned above, because both the extended network element 105 and the AOM 102 are specifically configured for PLM related interaction with one-another in this first example, the PLM information and commands sent between the AOM 102 and the extended network element 105 can be formatted in a manner that is beneficial for PLM. That is, the PLM information does not necessarily need to conform to a format specified by the MSA or standard corresponding to the inventory interface. In some examples, the PLM information can be provided in a human readable form, such that a technician viewing the data, can easily understand the content. Such information in human readable form can include an indication of whether or not a passive optical connector is connected to the AOM 102, whether a passive optical connector connected to the AOM 102 is managed, unmanaged, or an error has occurred, and/or a identifier (e.g., serial number) for the passive optical connector or a storage device 132 therein.

The extended network element 105 can be configured to decode some or all of the PLM information provided by the AOM 102 in order to use the PLM information for networking related functions. For example, the extended network element 105 may decode the PLM information to obtain an identifier for the passive optical connector 118 and/or memory device 132. The extended network element 105 may then use this information to aid in developing routing tables or the like, or more generally, for understanding the connections to the extended network element's 105 ports 106.

In a second example, the extended network element 105 is configured for "north-bound" PLM domain interactions with the PLM domain management entity 152. In such an example, the PLM software 162, when executed by the processing device(s) 137 of the extended network element 105, provides functionality for the extended network element 105 to be full peer in the PLM domain. That is, the PLM software 162 can provide similar functionality for the extended network element 105 as occurs for a PLM domain enabled patch panel 108. Such PLM software 162 can provide functionality such that the extended network element 105 can discover the PLM domain management entity 152 and is discoverable by the PLM domain management entity 152. The PLM software 162 can also provide functionality for the extended network element 105 to (knowingly) report PLM information to the PLM domain management entity 152. The format of the communication between the extended network element 105 and the PLM domain management entity 152 can be its native PLM protocol (i.e., a protocol established for use by the PLM system). Thus, the PLM information would not need to be squeezed into spaces of existing MIBs or the like as discussed above for non-native network elements 104. Non-native network elements 104, in contrast, can only communicate with the PLM domain management entity 152 in limited manners that are established for the network management entity 154, and typically need to be manually entered into the PLD management system/entity 152 because the non-native network element 104 is not discoverable.

Additionally, in this second example, the extended network element 105 can include (e.g. in a storage device therein) PLM information corresponding to itself, such as a PLM unique identifier, make, model of the network element 105, and other information. This PLM information can be provided to the PLM domain management entity 152 as well.

In a third example, the extended network element 105 could be configured for both "north-bound" and "south-bound" PLM related interactions.

Advantageously, the AOM 102 enables access for the PLM system to PCM 110 connected to both non-native and native network elements (through the AOM 102) even if the non-native and native network elements do not have a PLM native PLM storage-device interface themselves. Instead, the AOM 102 includes the PLM native PLM storage-device interface 262 and obtains the PLM information and provides the PLM information to the PLM system via the non-native or native network element as discussed above.

EXAMPLE EMBODIMENTS

Example 1 includes a pluggable active optical module comprising: an inventory interface at a first end for communicating electrical signals; one or more optical adapters at a second end for communicating optical signals to/from one or more optical fibers; a native PLM storage-device interface at the second end, wherein the native PLM storage-device interface is configured to contact a corresponding native PLM storage-device interface on the one or more optical fibers; one or more optical assemblies for converting electrical signals from the inventory interface into optical signals for transmission over the one or more optical fibers and for converting optical signals from the one or more optical fibers to electrical signals for sending from the inventory interface; a controller for controlling the one or more optical assemblies; one or more processing devices coupled to the native PLM storage-device interface and to the inventory interface, wherein the one or more processing devices are configured to access a storage device in one or more optical fibers through the native PLM storage-device interface and obtain physical layer management (PLM) information therefrom, wherein in response to a request to read a standard table entry the one or more processing devices are configured to provide PLM information to a network element in a format complying with a multi-source agreement (MSA) or a standard for the inventory interface, wherein in response to a request to read a non-standard table entry, the one or more processing devices are configured to provide PLM information to the network element in a format configured for a physical layer management system.

Example 2 includes the pluggable active optical module of Example 1, wherein the standard table entry is an address defined by the MSA or a standard for the inventory interface, wherein the non-standard table entry is an address that is not defined by the MSA or a standard for the inventory interface.

Example 3 includes the pluggable active optical module of any of Examples 1-2, wherein the format complying with the MSA or standard includes including the PLM information in one or more fields allocated by the MSA or standard.

Example 4 includes the pluggable active optical module of Example 3, wherein the one or more fields include one or more of a required field and a user defined field.

Example 5 includes the pluggable active optical module of any of Examples 1-4, wherein the inventory interface complies with the I$^2$C protocol.

Example 6 includes the pluggable active optical module of Example 5, wherein the standard table entry is one of the 0xA0 or 0xA2 addresses, wherein the non-standard table entry is one of the 0xA4 or 0xA6 addresses.

Example 7 includes the pluggable active optical module of any of Examples 1-6, wherein the format configured for PLM includes a format compatible with a PLM domain management entity in communication with the network element.

Example 8 includes the pluggable active optical module of any of Examples 1-7, wherein the format configured for PLM includes a format compatible with decoding at the network element.

Example 9 includes a system comprising: a non-native network element having a first port with a first inventory interface; a first pluggable active optical module installed in the first port and coupled to the first inventory interface, wherein in response to a request to read a standard table entry the first pluggable active optical module is configured to provide PLM information to the non-native network element in a format complying with a multi-source agreement (MSA) or a standard for the inventory interface; an extended network element having a second port with a second inventory interface; and a second pluggable active optical module installed in the second port and coupled to the second inventory interface, wherein in response to a request to read a non-standard table entry, one or more processing devices are configured to provide PLM information to the extended network element in a format configured for a physical layer management system.

Example 10 includes the system of Example 9, wherein the extended network element includes: networking software to provide core networking functionality for the extended network element; and physical layer management software to provide functionality for the extended network element to send the request to read the non-standard table entry.

Example 11 includes the system of any of Examples 9-10, wherein the standard table entry is an address defined by the MSA or standard for the inventory interface, wherein the non-standard table entry is an address that is not defined by the MSA or standard for the inventory interface.

Example 12 includes the system of any of Examples 9-11, wherein the format complying with the MSA or standard includes including the PLM information in one or more fields allocated by the MSA or standard Example 13 includes the system of any of Examples 9-12, wherein the inventory interface complies with the I²C protocol.

Example 14 includes the system of any of Examples 9-13, wherein the extended network element is configured to decode the PLM information from the second pluggable active optical module.

Example 15 includes the system of any of Examples 9-14, wherein the one or more processing devices are configured to report PLM information to a PLM domain management entity in response to receiving updated PLM information from the pluggable active optical module.

Further details, embodiments, and implementations can be found in the following United States Patent Applications, all of which are hereby incorporated herein by reference:

U.S. Provisional Patent Application Ser. No. 61/152,624, filed on Feb. 13, 2009, titled "MANAGED CONNECTIVITY SYSTEMS AND METHODS" (also referred to here as the "'624 Application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 Application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 Application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 Application); U.S. patent application Ser. No. 12/705,514, filed on Feb. 12, 2010, titled "MANAGED CONNECTIVITY DEVICES, SYSTEMS, AND METHODS" (also referred to here as the '514 Application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 Application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 Application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 Application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 Application"); U.S. Provisional Patent Application Ser. No. 61/303,961, filed on Feb. 12, 2010, titled "FIBER PLUGS AND ADAPTERS FOR MANAGED CONNECTIVITY" (the "'961 Application"); and U.S. Provisional Patent Application Ser. No. 61/303,948, filed on Feb. 12, 2010, titled "BLADED COMMUNICATIONS SYSTEM" (the "'948 Application"); U.S. Provisional Patent Application Ser. No. 61/252,964, filed on Oct. 19, 2009, titled "ELECTRICAL PLUG FOR MANAGED CONNECTIVITY", U.S. Provisional Patent Application Ser. No. 61/253,208, filed on Oct. 20, 2009, titled "ELECTRICAL PLUG FOR MANAGED CONNECTIVITY", U.S. patent application Ser. No. 12/907,724, filed on Oct. 19, 2010, titled "MANAGED ELECTRICAL CONNECTIVITY SYSTEMS", U.S. Provisional Patent Application Ser. No. 61/303,948, filed on Feb. 12, 2010, titled "PANEL INCLUDING BLADE FEATURE FOR MANAGED CONNECTIVITY", U.S. Provisional Patent Application Ser. No. 61/413,844, filed on Nov. 15, 2010, titled "COMMUNICATIONS BLADED PANEL SYSTEMS", U.S. Provisional Patent Application Ser. No. 61/439,693, filed on Feb. 4, 2011, titled "COMMUNICATIONS BLADED PANEL SYSTEMS", U.S. patent application Ser. No. 13/025,730, filed on Feb. 11, 2011, titled "COMMUNICATIONS BLADED PANEL SYSTEMS", U.S. patent application Ser. No. 13/025,737, filed on Feb. 11, 2011, titled "COMMUNICATIONS BLADED PANEL SYSTEMS", U.S. patent application Ser. No. 13/025,743, filed on Feb. 11, 2011, titled "COMMUNICATIONS BLADED PANEL SYSTEMS", U.S. patent application Ser. No. 13/025,750, filed on Feb. 11, 2011, titled "COMMUNICATIONS BLADED PANEL SYSTEMS", U.S. Provisional Patent Application Ser. No. 61/303,961; filed on Feb. 12, 2010, titled "Fiber Plug And Adapter For Managed Connectivity", U.S. Provisional Patent Application Ser. No. 61/413,828, filed on Nov. 15, 2010, titled "Fiber Plugs And Adapters For Managed Connectivity", U.S. Provisional Patent Application Ser. No. 61/437,504, filed on Jan. 28, 2011, titled "Fiber Plugs And Adapters For Managed Connectivity", U.S. patent application Ser. No. 13/025,784, filed on Feb. 11, 2011, titled "Managed Fiber Connectivity Systems", U.S. patent application Ser. No. 13/025,788, filed on Feb. 11, 2011, titled "Managed Fiber Connectivity Systems", Attorney Docket No 02316.3071USU2; U.S. patent application Ser. No. 13/025,797, filed on Feb. 11, 2011, titled "Managed Fiber Connectivity Systems", U.S. patent application Ser. No. 13/025,841, filed on Feb. 11, 2011, titled "Managed Fiber Connectivity Systems", U.S. Provisional Patent Application Ser. No. 61/413,856, filed on Nov. 15, 2010, titled "CABLE MANAGEMENT IN RACK SYSTEMS", U.S. Provisional Patent Application Ser. No. 61/466,696, filed on Mar. 23, 2011, titled "CABLE MANAGEMENT IN RACK SYSTEMS", Attorney Docket No. 02316.3090USP2; U.S. Provisional Patent Application Ser. No. 61/252,395, filed on Oct. 16, 2009, titled "MANAGED CONNECTIVITY IN ELECTRICAL SYSTEMS",U.S. patent application Ser. No.

12/905,689, filed on Oct. 15, 2010, titled "MANAGED CONNECTIVITY IN ELECTRICAL SYSTEMS", U.S. Provisional Patent Application Ser. No. 61/252,386, filed on Oct. 16, 2009, titled "MANAGED CONNECTIVITY IN FIBER OPTIC SYSTEMS", U.S. patent application Ser. No. 12/905,658, filed on Oct. 15, 2010, titled "MANAGED CONNECTIVITY IN FIBER OPTIC SYSTEMS", U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM", U.S. Provisional Patent Application Ser. No. 61/467,725, filed on Mar. 25, 2011, titled "DYNAMICALLY DETECTING A DEFECTIVE CONNECTOR AT A PORT", U.S. Provisional Patent Application Ser. No. 61/467,729, filed on Mar. 25, 2011, titled "IDENTIFIER ENCODING SCHEME FOR USE WITH MULTI-PATH CONNECTORS", U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS", USPR; and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL",.

What is claimed is:

1. A pluggable active optical module comprising:
an inventory interface at a first end for communicating electrical signals;
one or more optical adapters at a second end for communicating optical signals to/from one or more optical fibers;
a native physical layer management (PLM) storage-device interface at the second end, wherein the native PLM storage-device interface is configured to contact a corresponding native PLM storage-device interface on the one or more optical fibers;
one or more optical assemblies for converting electrical signals from the inventory interface into optical signals for transmission over the one or more optical fibers and for converting optical signals from the one or more optical fibers to electrical signals for sending from the inventory interface;
a controller for controlling the one or more optical assemblies;
one or more processing devices coupled to the native PLM storage-device interface and to the inventory interface, wherein the one or more processing devices are configured to access a storage device in one or more optical fibers through the native PLM storage-device interface and obtain PLM information therefrom,
wherein in response to a request to read a table entry the one or more processing devices are configured to provide PLM information to a network element.

2. The pluggable active optical module of claim 1, wherein when the table entry is a standard table entry, the PLM information is provided to the network element in a format complying with a multi-source agreement (MSA) or a standard for the inventory interface;
wherein when the table entry is a non-standard table entry, the PLM information is provided to the network element in a format configured for a PLM system.

3. The pluggable active optical module of claim 2, wherein the standard table entry is an address defined by the MSA or a standard for the inventory interface, wherein the non-standard table entry is an address that is not defined by the MSA or a standard for the inventory interface.

4. The pluggable active optical module of claim 2, wherein the format complying with the MSA or standard for the inventory interface includes including the PLM information in one or more fields allocated by the MSA or standard for the inventory interface.

5. The pluggable active optical module of claim 4, wherein the one or more fields include one or more of a required field and a user defined field.

6. The pluggable active optical module of claim 2, wherein the inventory interface complies with the $I^2C$ protocol.

7. The pluggable active optical module of claim 6, wherein the standard table entry is one of the 0xA0 or 0xA2 addresses, wherein the non-standard table entry is one of the 0xA4 or 0xA6 addresses.

8. The pluggable active optical module of claim 2, wherein the format configured for a PLM system includes a format compatible with a PLM domain management entity in communication with the network element.

9. The pluggable active optical module of claim 2, wherein the format configured for a PLM system includes a format compatible with decoding at the network element.

10. A system comprising:
a non-native network element having a first port with a first inventory interface;
a first pluggable active optical module installed in the first port and coupled to the first inventory interface, wherein in response to a request to read a standard table entry the first pluggable active optical module is configured to provide physical layer management (PLM) information to the non-native network element;
an extended network element having a second port with a second inventory interface; and
a second pluggable active optical module installed in the second port and coupled to the second inventory interface, wherein in response to a request to read a non-standard table entry, one or more processing devices are configured to provide PLM information to the extended network element.

11. The system of claim 10, wherein the extended network element includes:
networking software to provide core networking functionality for the extended network element; and
PLM software to provide functionality for the extended network element to send the request to read the non-standard table entry.

12. The system of claim 10, wherein the first pluggable active optical module provides PLM information to the non-native network element in a format complying with a multi-source agreement (MSA) or a standard for the first inventory interface; and
wherein the one or more processing devices provide PLM information to the extended network element in a format configured for a PLM system.

13. The system of claim 12, wherein the standard table entry is an address defined by the MSA or standard for the first inventory interface, wherein the non-standard table entry is an address that is not defined by the MSA or standard for the second inventory interface.

14. The system of claim 12, wherein the format complying with the MSA or standard includes including the PLM information in one or more fields allocated by the MSA or standard.

15. The system of claim 10, wherein the inventory interface complies with the $I^2C$ protocol.

16. The system of claim 10, wherein the extended network element is configured to decode the PLM information from the second pluggable active optical module.

17. The system of claim 10, wherein the one or more processing devices are configured to report PLM information to a PLM domain management entity in response to receiving updated PLM information from the second pluggable active optical module.

18. A method comprising:
communicating electrical signals at an inventory interface at a first end;
communicating optical signals to/from one or more optical adapters at a second end;
wherein a native physical layer management (PLM) storage-device interface at the second end is configured to contact a corresponding native PLM storage-device interface on one or more optical fibers;
converting the electrical signals from the inventory interface at one or more optical assemblies into optical signals for transmission over the one or more optical fibers;
converting the optical signals from the one or more optical fibers at the one or more optical assemblies to electrical signals for sending from the inventory interface;
controlling the one or more optical assemblies at a controller;
accessing a storage device in one or more optical fibers through the native PLM storage-device by one or more processing devices coupled to the native PLM storage-device interface and to the inventory interface; and
obtaining PLM information by the one or more processing devices from the native PLM storage-device,
wherein in response to a request to read a table entry the one or more processing devices are configured to provide PLM information to a network element.

19. The method of claim 18, wherein the one or more processing devices provides PLM information to the network element in a format complying with a multi-source agreement (MSA) or a standard for the inventory interface when the table entry is a standard table entry; and
wherein the one or more processing devices provide PLM information to the network element in a format configured for a PLM system when the table entry is a non-standard table entry.

20. The method of claim 19, wherein the standard table entry is an address defined by the MSA or a standard for the inventory interface, wherein the non-standard table entry is an address that is not defined by the MSA or a standard for the inventory interface.

* * * * *